United States Patent [19]

Jackson

[11] 3,953,335

[45] *Apr. 27, 1976

[54] MAGNESIA STABILIZED ADDITIVES FOR NON-CLAY WELLBORE FLUIDS

[76] Inventor: Jack M. Jackson, P.O. Box 35221, Houston, Tex. 77035

[ * ] Notice: The portion of the term of this patent subsequent to Dec. 3, 1991, has been disclaimed.

[22] Filed: Dec. 1, 1972

[21] Appl. No.: 311,274

Related U.S. Application Data

[63] Continuation-in-part of Ser. No. 101,123, Dec. 23, 1970, abandoned.

[52] U.S. Cl.............................. 252/8.5 A; 106/307
[51] Int. Cl.² ........................................... C09K 7/00
[58] Field of Search.................. 166/307; 252/8.5 A

[56] References Cited
UNITED STATES PATENTS

| | | | |
|---|---|---|---|
| 2,570,947 | 10/1951 | Himel et al. | 252/8.5 |
| 2,856,356 | 10/1958 | Weiss et al. | 252/8.5 |
| 2,868,726 | 1/1959 | Brukner et al. | 252/8.5 A |
| 2,868,726 | 1/1959 | Brukner et al. | 252/8.5 |
| 3,220,947 | 11/1965 | Sawyer | 252/8.5 A |
| 3,319,715 | 5/1967 | Parks | 252/8.5 C |
| 3,640,826 | 2/1972 | Lang et al. | 252/8.5 A |
| 3,753,903 | 8/1973 | Fischer et al. | 252/8.5 A |

FOREIGN PATENTS OR APPLICATIONS

1,020,585 12/1957 Germany

*Primary Examiner*—Benjamin R. Padgett
*Assistant Examiner*—B. H. Hunt
*Attorney, Agent, or Firm*—Kenneth H. Johnson

[57] ABSTRACT

The additives are employed in non-clay wellbore fluids, as for example, in clear water, brines or emulsions used for drilling, well completion, workover, fracturing, and such stimulation operations as diverting injected flood fluids and acids or solvents. The basic additive may be a single organic material added primarily as a hydroxyalkyl cellulose viscosifier, hydroxyethyl cellulose (HEC) for example, stabilized with magnesia.

Other conventional additives include natural gums, artificial gums, cellulose derivatives such as polyanionic cellulose polymers and anionic heteropolysaccharides, and pseudoplasticity-imparting gums and polymers such as hydrolyzed polyamides, lignosulfonate salts, same being used primarily for control of either viscosity or fluid loss, although such may have some controlling effect on both quantities.

In general the magnesia stabilizer causes the viscosifier basic additive to act more quickly in absorbing water to thicken the wellbore fluid. It also will stabilize the thickened fluid at elevated temperatures and over a longer period than can be done by the basic additive alone. For those basic additives having fluid loss control properties the stabilizer simply tends to reduce the fluid lost to the formation over any given period of time.

5 Claims, No Drawings

MAGNESIA STABILIZED ADDITIVES FOR NON-CLAY WELLBORE FLUIDS

The present invention is a continuation-in-part of application Ser. No. 101,123, filed Dec. 23, 1970, now abandoned.

BACKGROUND OF THE INVENTION

The present invention lies in the field of additives to wellbore fluids used while drilling wells in earth formations, completion operations after the drilling has been completed, workover, fracturing, and various other operations is a wellbore. More particularly, the invention is concerned with additives to non-clay wellbore fluids such as pure water, various brines and emulsions of water and oil. The additives of the invention include two parts, a basic additive used to control one or both the viscosity of the fluid and its fluid loss properties, and a catalyst or stabilizer which enhances the effect of the basic additives.

Quite frequently clay-based drilling muds, such as, those described in U.S. Pat. Nos. 1,856,356 to Weiss et al and 2,868,726 to Bunker et al. have employed a common water loss additive such as pre-hydrolyzed starch or carboxy-methylcellulose (CMC). Carboxymethyl cellulose as such is a non-ionic water insoluble material. As a result CMC or carboxymethyl cellulose is employed as a soluble salt of carboxymethyl cellulose. The use of these salts as water loss additives has presented quite a problem as denoted in U.S. Pat. No. 3,625,889 to Branscum. The presence of even small amounts of water soluble inorganic compounds, such as calcium chloride will expel CMC from the solution. For that reason CMC has never been satisfactory for use with non-clay fluids because in the non-clay fluids water soluble inorganic salts are employed to develop the desired density.

Non-clay wellbore fluids are desirable where, for example, the build-up of a filter cake is undesirable. Moreover, the heaving shale materials or clays in contact with the clay-based drilling fluid results in incidental and undesirable fluctuation of the properties of the drilling fluids. Removal of these extraneous materials from the clay-based mud is especially difficult because of the similarity of the extraneous material and the clay base. In the non-clay based wellbore fluids, such solids are easily removed from the fluid without removal of any of the drilling components because of the dissimilarity of the materials, i.e., extraneous materials and wellbore fluid.

Various methods have been proposed for overcoming the incidental mud-making aspects of clay-based drilling fluids. The Weiss et al. patent dislcosed that very high magnesium ion content, that is, at least 400 ppm of magnesium ion in the drilling fluid will prevent or at least reduce incidental mudmaking by stabilizing or hardening the heavy shale material or clays in contact with the drilling fluid. One manner of achieving this high magnesium ion content proposed by Weiss et al. is the use of an exotic MgO described as "hydratable magnesium oxide", which is obtained only by low temperature preparation as opposed to commonly available high temperature MgO known as magnesia which is essentially non-hydratable. The solubility of the hydratable MgO is further enhanced by soluble ammonium salts in order to totally solubilize the MgO and effect the high magnesium ion content.

Heaving shale and clays in the wellbore do not present the same type of problem to non-clay based fluids since the solids are easily removed without changing the nature of the wellbore fluid, and a magnesium ion content is not necessary or particularly desirable.

When a non-clay wellbore fluid is used for a purpose requiring relatively high viscosity, for example drilling or milling, it is generally necessary to employ an additive to thicken the fluid to the point where it will have the necessary carrying capacity. Several additives to increase viscosity are commercially available, but most if not all of these have one or more limitations. The viscosifier may be slow to yield, i.e., it may take 15 minutes or more from the time of addition to the time when the fluid becomes thick enough to carry the cuttings. The additives may be effective over only a narrow low temperature range, permitting the fluid to thin out again when a higher temperature is reached. In addition, most of the viscosifiers have a limited service life, again thinning out after a period of use.

A class of compounds that has now been recognized as being suited for providing non-structured viscosity to non-clay wellbore fluids are the hydroxyalkyl cellulose. These materials such as hydroxyethyl cellulose (HEC) and hydroxypropyl cellulose are water soluble and non-ionic, thus they are not susceptible to being expelled from a brine solution, for example as are the soluble salts of carboxy-methyl cellulose. The term "non-structured viscosity" as used here means one wherein viscosity is obtained by physio-chemical rather than by physical means. Asbestos and attapulgite are examples of the types of materials employed to obtain structured viscosity.

The non-structured viscosity provides another unique benefit in that the carrying capacity will vary in the agitated and non-agitated states, so that when, for example, the agitation is reduced in a separating tank the carrying capacity will drop off and the cuttings and the like from the wellbore will fall out of the fluid, yet when agitated there is ample carrying capacity to carry the cuttings and the like to the surface from the wellbore.

Unfortunately, hydroxyalkyl cellulose is unstable in boreholes and has been relegated to the task of a water loss additive in clay-based fluids, such as those shown in U.S. Pat. No. 2,570,947 to Himel et al.

It is a general object of the present invention to provide additives for wellbore fluids in which the above enumerated disadvantages of commercially available viscosifiers will be eliminated or reduced. Stated positively, this general object is to provide additives for non-clay drilling fluids which are stabilized to provide faster yields, effectiveness over a higher temperature range, and effectiveness over a longer time period.

Commercially available additives for non-clay drilling fluids for the purpose of controlling loss of filtrate to the formation, whether alone or for the additional property of controlling viscosity, also have a disadvantage, namely that the fluid loss they permit is not as minimal as might be desired. It is therefore a second general purpose of the present invention to stabilize such additives to increase their effectiveness in reducing the amount of fluid lost to the formations to which the fluid is exposed.

The additives of the present invention are also designed for use in closed circuit drilling fluid circulation systems avoiding the many disadvantages of clay-based drilling mud, e.g., hydration and disintegration of drilled solids and the many disadvantages flowing therefrom such as overly large increases in unit weight and viscosity, build-up of an overly thick filter cake on the bottom and sidewall of the hole, swabbing and caving in of the cake and sidewall, and the necessity for the mud engineer to discard a part of the overladen fluid, thin out the rest and replace some of the additives discarded with the diverted fraction. The above and other desirable objects and advantages are achieved according to the present invention by stabilizing various commercially available additives with a material acting in the nature of a catalyst.

SUMMARY OF THE INVENTION

Briefly stated the present invention is an additive composition for non-clay wellbore fluids having improved viscosity stability and reduced water loss, consisting essentially of water soluble non-ionic hydroxyalkyl cellulose and a stabilizing amount of magnesia.

A preferred hydroxyalkyl cellulose is hydroxyethyl cellulose (HEC). Other suitable hydroxyalkyl cellulose compounds would include hydroxypropyl cellulose, di(hydroxyalkyl) cellulose such as di(hydroxyethyl) cellulose, di(hydroxypropyl) cellulose and the like.

Magnesia is a highly infusible magnesium oxide (MgO), prepared by the calcination of magnesium carbonate, ($MgCO_3$). Magnesia is only slightly soluble in water, e.g., 0.0086 grams/100 cc (86 ppm) of water at 30° C. and is essentially non-hydratable. One theory for the effectiveness of the present invention is that the very slightly soluble magnesia which is present in excess of its solubility in the wellbore fluid provides a reservoir of basicity of just the correct amount to maintain the pH of the fluid in the range at which the hydroxyalkyl cellulose is most stable. This theory is proposed as a possible explanation for the operation of the present invention and is not intended to limit the scope of the invention.

The present invention unlike the method disclosed in Weiss et al. Patent (U.S. Pat. No. 2,856,356) does not require or desire a high magnesium ion concentration in the wellbore fluid. The amount of magnesia that is soluble in the wellbore fluids of the present invention never approaches the minimum amount of magnesium ion concentration required by Weiss et al. The present invention also differs substantially from the Weiss et al. method in that the present additive composition has an excess of magnesia over the very small amount soluble in the wellbore fluids. It can also be appreciated that Weiss et al. was primarily concerned with overcoming a problem related to clay-based fluids and suggested the use of a hydratable magnesium oxide as a source of magnesium ions as distinguished from the relatively non-hydratable magnesia of the present invention.

In addition to the hydroxyalkyl cellulose and magnesia other conventional wellbore additives can be present, serving their usual functions. For example, the alkali and alkaline earth lignosulfonate salts such as calcium lignosulfonate, sodium lignosulfonates serving as water loss additives, starches, gums, and oil also serving as water loss additives, density modifying material such as calcium chloride, sodium chloride and zinc chloride. In other words, any of the known additive materials may be added so long as the basic characteristics of the non-clay wellbore fluid are not changed.

The slight solubility of magnesia in wellbore fluids results in a very low magnesium ion concentration, that is, less than 0.001% or 10 ppm of magnesium ion concentration or dissolved magnesium, yet the pH remains in the range of about 8.5 to about 11 when employed in stabilizing amounts. The magnesia must be employed in at least a greater amount than in soluble in the given volume of aqueous material to which it is added to obtain the benefits of the invention. The excess of magnesia beyond that soluble in the wellbore fluid may have some effect not appreciated at this time in regard to the present invention. The minimum amount of magnesia employed is at least an excess beyond that magnesia which is soluble in wellbore fluid or greater than about 0.001 by weight based on the aqueous component, which is about 0.0035 pounds of magnesia per barrel (42 gallons).

In one embodiment, the magnesia is present in an amount of from about 0.10% by weight based on the aqueous portion of the wellbore fluid.

The amount of hydroxyalkyl cellulose will vary depending on the particular use to which the wellbore fluid is to be put. The amount of hydroxyalkyl cellulose in relation to the magnesia is not critical, and the viscosity achieved by the hydroxyalkyl cellulose will be stabilized by the amounts of magnesia specified.

DETAILED DESCRIPTION OF THE INVENTION AND PREFERRED EMBODIMENTS

One combination according to the present invention is hydroxyethyl cellulose which is a well known viscosifier in brine fluids, to which was added magnesia to reduce the yield time from the prior art 15 minutes to about 2 or 3 minutes and which stabilizes the viscosity-increasing effect of the HEC at temperatures as high as 275° F over an indefinite length of time. The same stabilizer, magnesia, has also been added to a calcium lignosulfonate intended primarily as a fluid loss additive to contribute further to the pore-plugging ability of the lignosulfonate. These two magnesia-containing additives, HEC and calcium lignosulfonate, have been used successfully in experimental drilling fluids in field drilling operations with considerable success. In such drilling, the two stabilized additives were the only additives to a basic calcium chloride brine other than some inert particles used in bridging pores, specifically a calcium carbonate.

Through a considerable number of experiments and tests it has been found that the pH of the drilling fluid after combining it with the additives of the present invention should be controlled to lie between about 8.5 and about 11.0. The minimum quantity of additive is close to that indicated in the examples below, and there is no particular problem about any maximum other than the ultimate of wasting material in the sense that it has no further effect.

In one of the experimental uses referred to above, the basic fluid was a sodium chloride brine having a unit weight of 9.2 pounds per gallon. To use the fluid as a means for opening hole and gravel packing the producing zone to increase production, a magnesia stabilized HEC was added to the brine in the ratio of 1½ pounds of the additive per barrel of brine, the additive being that commercially available under the "Bex" trademark of Brinadd Company, in which the magnesia makes up 25 percent of the additive (0.375 pounds of magnesia per barrel, approximately 0.10% based on fluids). There was also added 4 pounds of Brinadd Company's "Bringeheal" additive, the same being a calcium lignosulfonate stabilized with 4 parts by weight of magnesia to 30 parts by weight of the lignosulfonate.

The brine as thus combined with the additive had a viscosity of 35 seconds by the Marsh funnel test and a fluid loss of 11.0 mil. as determined by the 30 minute API test. The fluid performed in a highly satisfactory method throughout the operation, and enabled the operator to open hole and place gravel without difficulty. Both additive packages, "Bex" and "Brigheal" have been employed separately with the improvements noted herein according to the present invention.

EXAMPLES

General. In each of the examples set forth in the following tables, the same procedure was used. The starting material was a 350 milliliter (ml) specimen, whether water or brine or other solution. All of the other materials indicated were dry at the outset, and the indicated quantities were blended together while still dry. The dry materials were then added to the basic fluid and stirred for five minutes, after which the specimen container was capped and allowed to sit overnight at room temperature. On the following morning, the first set of viscosity measurements were made, together with a pH measurement. After such measurements, the specimen was hot-rolled for 67 hours at 175° F, following which a second set of viscosity determinations were made, together with pH measurements and the 30 minute fluid loss test of the American Petroleum Institute (API).

Viscosity determinations were also made according to API standards, using a direct indicating viscometer, specifically a Fann V-G meter. The pH of the specimen was determined with a Beckman glass electrode pH meter.

| | Abbreviations |
|---|---|
| AV | apparent viscosity |
| PV | plastic viscosity |
| YP | yield point |
| FL | fluid loss |
| cp | centipoise |
| 9.1 salt | NaCl solution weighing 9.1 pounds per gallon of solution |
| NC | no control (at least 300 ml lost in API fluid loss test) |

The calcium lignosulfonate is that produced and marketed by St. Regis Pulp and Paper Co. under the name "Toranil B".

Table 1

| Example | HEC Viscosifier, MgO Stabilizers | | | |
|---|---|---|---|---|
| | 1 | 2 | 3 | 4 |
| 9.1 salt, ml | 350 | 350 | 350 | 350 |
| HEC, g | 1.0 | 1.0 | 1.0 | 1.0 |
| magnesia | | 0.5 | | 0.5 |
| calcium lignosulfonate, g | | | 5.0 | 5.0 |
| Properties after static aging 18 hours at room temperature | | | | |
| AV, cp | 14½ | 15 | 2½ | 16¾ |
| PV, cp | 9½ | 10½ | 2 | 11½ |
| YP, lb/100 ft² | 10 | 9 | 1 | 10½ |
| pH | 8.3 | 11.2 | 7.8 | 10.8 |
| Properties after dynamic aging 67 hours at 175°F. | | | | |

Table 1-continued

| Example | HEC Viscosifier, MgO Stabilizers | | | |
|---|---|---|---|---|
| | 1 | 2 | 3 | 4 |
| AV, cp | 12 | 13½ | 4¼ | 15¼ |
| PV, cp | 9 | 9½ | 4½ | 10½ |
| YP, lb/100 ft² | 6 | 8 | ½ | 9½ |
| pH | 8.4 | 11.1 | 5.5 | 10.0 |
| 30-minute API filtrate, ml | NC | 13.0 | NC | 91 |

From Table 1 it can be seen that the addition of .15% by weight of magnesia based on the water present will stabilize the viscosity and substantially improve water loss properties of a non-clay fluid. Of particular interest is the elimination of the detrimental effect to viscosity caused by calcium lignosulfonate shown in example 3, in addition to improving the water loss by the addition of magnesia in example 4.

Table 2

| Example | No Viscosifier | | |
|---|---|---|---|
| | 5 | 6 | 7 |
| 9.1 salt, ml | 350 | 350 | 350 |
| magnesia | 0.5 | | 0.5 |
| calcium lignosulfonate, g | | 5 | 5 |
| Properties after aging overnight at room temperature | | | |
| pH | 10.0 | 5.9 | 9.7 |
| Properties after hot-rolling for 67 hours at 175°F. | | | |
| pH | 9.9 | 5.0 | 9.4 |
| 30-minute API Fluid Loss, ml | TOTAL | 83 | 8.0 |

In table 2 the magnesia is shown to improve the water loss characteristics of calcium lignosulfonate in the absence of any viscosifier.

The present invention works in substantially the same manner to stabilize HEC viscosified fluids where the fluid is tap water, saturated salt solution, e.g., calcium chloride, sodium chloride and zinc chloride and other brines.

Similar stabilizing and water loss reducing effects on the lignosulfonates of ammonium, chromium (which preferably is a calcium lignosulfonate complexed with chromium cation and a divalent base to give a pH in the 6 to 10 range) and aluminum, and the lignosulfonate salts of the alkaline earth metals, and the trivalent metals, can be achieved.

The invention claimed is:

1. An additive composition for non-clay brine wellbore fluids having improved viscosity stability and reduced water loss consisting essentially of water soluble non-ionic hydroxyethyl cellulose and a hydroxyethyl cellulose stabilizing amount of magnesia.

2. The additive composition according to claim 1 wherein said hydroxyalkyl cellulose is hydroxyethyl cellulose.

3. The additive composition according to claim 2 wherein said magnesia comprises about 25% by weight of said composition.

4. The additive composition according to claim 3 wherein hydroxyethyl cellulose comprises about 75% by weight of said composition.

5. The additive composition according to claim 2 wherein lignosulfonate salt is present.

* * * * *

UNITED STATES PATENT OFFICE
CERTIFICATE OF CORRECTION

PATENT NO. : 3,953,335
DATED : April 27, 1976
INVENTOR(S) : Jack M. Jackson

It is certified that error appears in the above-identified patent and that said Letters Patent are hereby corrected as shown below:

Col. 6, delete lines 49-51. (claim 2).

Col. 6, line 53 (claim 3) after "claim" delete "2" and insert therefor -- 1 --.

Col. 6, line 58 (claim 5) after "claim" delete "2" and insert therefor -- 1 --.

Signed and Sealed this

Seventh Day of September 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,953,335
DATED : April 27, 1976
INVENTOR(S) : Jack M. Jackson

It is certified that error appears in the above—identified patent and that said Letters Patent are hereby corrected as shown below:

Column 4, line 4, "in" first occurrence should read -- is --.

Signed and Sealed this

Eleventh Day of March 1980

[SEAL]

Attest:

SIDNEY A. DIAMOND

Attesting Officer — Commissioner of Patents and Trademarks

UNITED STATES PATENT AND TRADEMARK OFFICE
CERTIFICATE OF CORRECTION

PATENT NO. : 3,953,335
DATED : April 27, 1976
INVENTOR(S) : Jack M. Jackson

It is certified that error appears in the above—identified patent and that said Letters Patent is hereby corrected as shown below:

Column 3, line 68 reads "is, less than 0.001% or 10 ppm of magnesium ion con-" but should read -- is, less than 0.01% or 100 ppm of magnesium ion con- --

Column 4, line 12 reads "about 0.001 by weight based on the aqueous compo-" but should read -- 0.01% by weight based on the aqueous compo- --

Column 4, line 13 reads "nent, which is about 0.0035 pounds of magnesia per" but should read -- nent- which is about 0.035 pounds of magnesia per --

Signed and Sealed this

Twenty-second Day of July 1980

[SEAL]

Attest:

SIDNEY A. DIAMOND

Attesting Officer

Commissioner of Patents and Trademarks